United States Patent Office 3,292,499
Patented Dec. 20, 1966

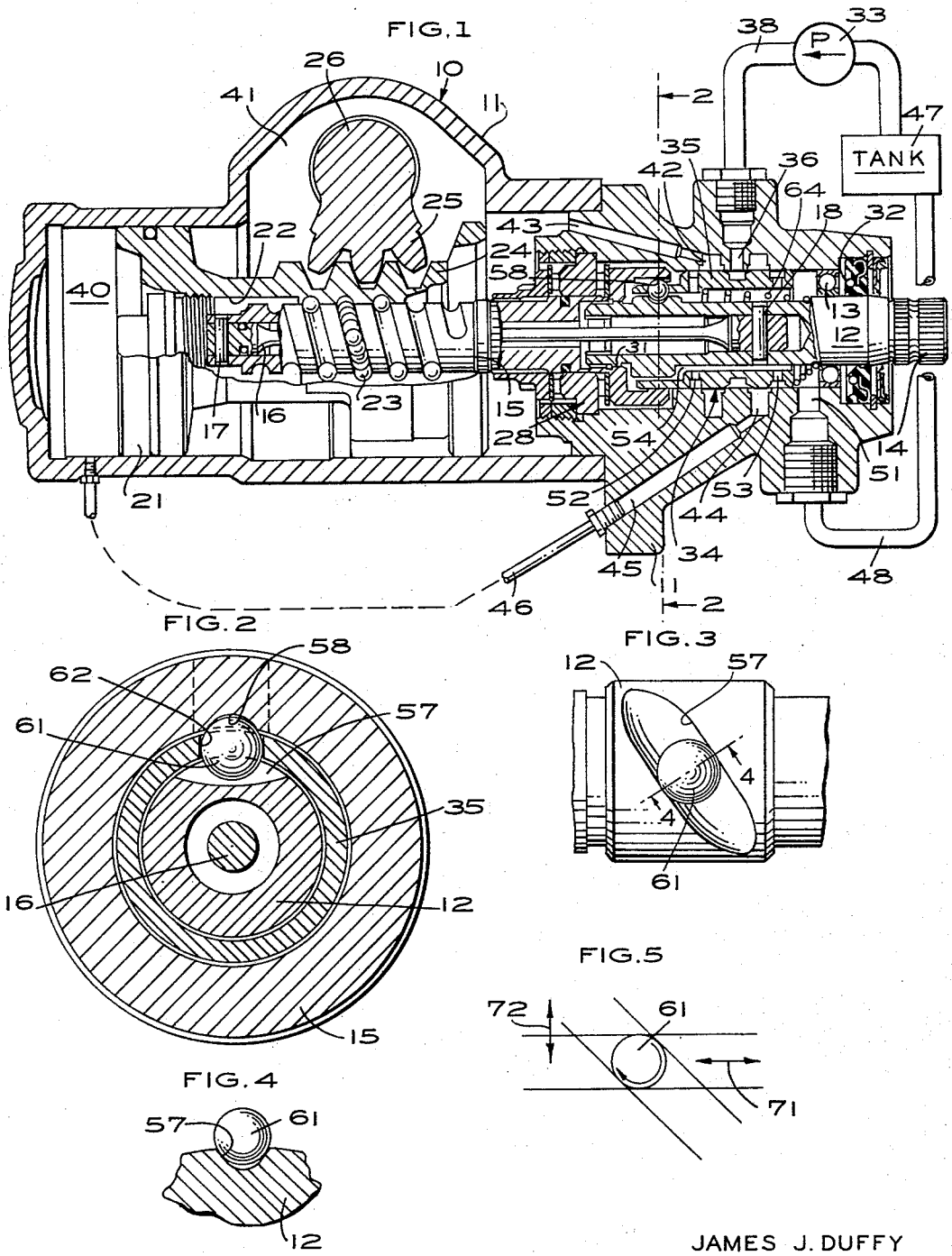

3,292,499
POWER STEERING GEAR
James J. Duffy, Livonia, Mich., assignor to Ford Motor Company, Dearborn, Mich., a corporation of Delaware
Filed July 8, 1964, Ser. No. 381,196
11 Claims. (Cl. 91—368)

This invention relates to a power steering gear and more particularly to a mechanism in a power steering gear for converting relative rotation between an input member and an output member into axial or reciprocatory motion for the operation of a valve spool that controls the flow of fluid under pressure to the power steering mechanism.

More particularly, the invention includes means positioned in an input member and an output member for receiving a valve actuating member and for converting the relative rotation of the input member with respect to the output member into axial or reciprocatory movement of the valve actuating member. The valve spool of the valve that controls actuation of the power assist in the steering mechanism is directly connected to the valve actuating member for direct actuation thereby. The means positioned in the input member and the output member comprise crossed grooves and in the preferred embodiment of the invention the input member has a helical groove and the output member has an axial groove that extends generally parallel to the axes of the input member, the output member and the valve spool. A ball is positioned in these grooves and the valve spool includes a cylindrical aperture just slightly larger than the ball that receives the ball and directly actuates the valve spool as a result of relative rotation between the input member and the output member.

This structure has substantial advantages over known power steering valve actuating mechanisms in that it is inexpensive and uncomplicated to construct. It provides a very compact package with respect to both length and diameter. It has a very substantial advantage over certain known valve actuating mechanisms in that it permits misalignment between the valve spool and the other members of the actuating mechanisms including the output member since the ball is a perfect swivel or universal joint that will permit these misalignments without binding or sticking of the valve actuating mechanism.

An object of the present invention is the provision of a power steering gear that includes a simple and inexpensive valve actuating mechanism.

Another object of the invention is the provision of a power steering gear that includes a valve actuator for a power steering gear that permits misalignment of the valve spool with respect to the other components of the actuating mechanism thereby eliminating binding and sticking that may otherwise occur.

A further object of the invention is the provision of a power steering gear including a valve actuating mechanism that has reduced length and bulk.

Other objects and attendant advantages of the invention will become more apparent as the specification is considered in connection with the attached drawings in which:

FIGURE 1 is a split longitudinal sectional view of the power steering gear of the invention including the hydraulic or fluid circuit shown in schematic form, with the top half of the view showing a larger diameter valve mechanism than the bottom half of the view;

FIGURE 2 is a partial sectional view taken along the lines 2—2 of FIGURE 1;

FIGURE 3 is a top plan view of the input member or shaft of the power steering gear showing a helical groove in this member;

FIGURE 4 is a sectional view taken along the lines 4—4 of FIGURE 3, and

FIGURE 5 is a schematic view showing the movement of the ball actuator of the invention with respect to the various components of the mechanism.

Referring now to the drawings in which like reference numerals designate like parts throughout the several views thereof, there is shown in FIGURE 1 a power steering gear of the integral type generally designated by the numeral 10. The steering gear 10 includes a housing 11 that has an input member or shaft 12 rotatably mounted therein by means of a ball bearing 13. The input member or shaft 12 is adapted to be connected through splines 14 to the steering shaft and steering wheel (not shown) of the automotive vehicle in which the steering gear 10 is mounted.

The input member or shaft 12 is connected to an output member or worm 15 of the steering gear 10 through a torsion bar 16. It can be seen that the torsion bar 16 is pinned at 17 to the output member or worm 15 and at 18 to the input member or shaft 12.

The output member or worm 15 forms a part of an output group of the power steering gear 10. The other parts of the output group include a power piston 21 that has an internal bore 22 for receiving the output member or worm 15. The power piston 21 and the output member or worm 15 are coupled through a standard recirculating ball nut arrangement 23 that converts rotary motion of the worm or output member 15 into axial or reciprocatory motion of the power piston 21 and vice versa. The power piston 21 has formed thereon a rack 24 that engages sector gear 25 formed integrally with the power steering gear output shaft 26. The output shaft 26 is coupled to the steerable road wheels of the vehicle through a standard linkage mechanism (not shown).

The output member or worm 15 is rotatably journaled within the housing 11 by means of a combination thrust and radial bearing 28 and the end of the input member or shaft 12 opposite the splines 14 is rotatably journaled within the output member or worm 15 as shown at 31. A standard sealing means 32 provides a seal between the housing 11 and the rotatable input member or shaft 12.

Fluid under pressure for providing power assist in the power steering gear 10 is provided by means of a hydraulic fluid circuit that includes a source of fluid under pressure, pump 33, that may be selectively connected to provide fluid under pressure to either side of the power piston 21 under the control of a fluid control valve 34 of the spool type that includes a valve spool 35. It should be noted that FIGURE 1 is a split view with the half above the centerline showing a valve spool 35 and associated mechanism having a larger diameter than the valve spool and associated mechanism shown in the lower half.

The hydraulic fluid circuit is conventional as is the fluid control valve 34. In this system, fluid under pressure is supplied to inlet port 36 from the pump 33 through a conduit 38. This fluid under pressure may be supplied to one side of the power piston 21 defined by the chamber 41 through port 42 and a conduit 43. Likewise, fluid under pressure may be supplied to the other side of the power piston 21 defined by chamber 40 through a port 44 and conduits 45 and 46. A return to the tank 47 is provided by means of conduit 48, outlet port 51, openings 52 and 53 in the valve spool 35 and the radial space 54 between the valve spool 35 and the input member or shaft 12.

The power steering gear 10 as a whole operates in a conventional manner. If the input torque applied to the input member or shaft 12 is below a predetermined level and this is sufficient to accomplish steering operations, the gear operates as a manual gear since the rotary motion applied to the input member or shaft 12 is applied directly to the output member or worm 15 through the torsion bar 16 with no relative rotation between the input member or shaft 12 and the output member or worm 15. This operates the gear and the valve spool 35 will remain in a neutral position. If, however, the input torque applied to the input shaft or member 12 to accomplish the steering operation is in excess of this predetermined level, the torsion bar 16 will be twisted and relative rotation will occur between the input member or shaft 12 and the output member or worm 15. This relative rotation is employed to reciprocate or shift axially the valve spool 35 through the actuating mechanism of this invention.

The actuating mechanism of the invention includes means positioned in the input member or shaft 12 and in the output member or worm 15 that receives a valve actuating means or member that is in turn directly connected to the valve spool 35. As shown in the drawings, the means in the input member or shaft 12 comprises a helical V-groove 57 positioned in the outer circumference of the input member or shaft 12 and helically arranged with respect to the axis of this member. An axial groove 58 is formed in the output member or worm 15 in a portion thereof that is radially spaced from the helical groove 57 in the input member or shaft 12. A valve actuating means or member, in the form of a ball actuator 61, is positioned in the grooves 57 and 58, and the valve spool 35 is directly connected to this valve actuating means or member. This is done by means of a cylindrical aperture 62 that has substantially the same diameter as that of the ball actuator 61. Just a small operating clearance is provided.

As can be seen from the drawings, the portion of the valve spool 35 that has the cylindrical aperture 62 located therein extends radially between the portions of the input member or shaft 12 and the output member or worm 15 that have the grooves 57 and 58 located therein so that the ball actuator 61 may be received within the cylindrical aperture 62. A spring, preferably in the form of a helical spring 64, is employed to eliminate lost motion or backlash in the valve actuating mechanism. This spring, as shown, engages a shoulder on the input member or shaft 12 and a shoulder on the valve spool 35, and this forces the valve spool against the ball 61 thereby in turn forcing the ball 61 against the side of the groove 57 that is opposite this spring. The spring 64 may be positioned inside the valve spool 35 in the larger diameter valve spool shown in the upper half of FIGURE 1 and will abut an internal shoulder in this valve spool. In the smaller diameter valve spool shown on the lower half of this view, however, the spring 64 abuts the end of the valve spool.

When the input torque applied to the input member or shaft 12 is below the predetermined level at which power assist is needed, the valve spool 35 will be in the neutral position and the ball actuator 61 will be positioned centrally in the helical groove 57 in the input member or shaft 12 as shown in FIGURE 3. If, however, the input torque applied to the input member or shaft 12 to accomplish steering operations is in excess of this predetermined level, relative rotation will occur between the input member or shaft 12 and the output member or worm 15 against the force of the torsion bar 16. This will cause the ball actuator 61 to move in an axial direction with respect to the axes of the input member or shaft 12, the output member or worm 15, and the valve spool 35 since it is confined for movement in this direction by the axial groove 58 in the output member or worm 15. This will shift the valve spool in one direction or the other, depending on whether a left-hand or a right-hand turn is being accomplished. This shifting of the valve spool in its axial direction will pressurize either one side or the other of the power piston 21 through the fluid circuit previously described to thereby provide power assist for the turn.

Although the invention has been shown with a helical groove 57 positioned in the input member or shaft 12 and an axial groove 58 positioned in the output member or worm 15, it is not necessary that this exact form of groove arrangement be followed. It is only necessary that one groove be helical and that the grooves not be parallel. This will provide the necessary axial movement of the ball actuator 61 to actuate the valve spool 35. Also, the ball actuator 61 may take other forms, for example, it could comprise a split ball that is spring loaded from the center against both the grooves 57 and 58 in the input member or shaft 12 and the output member or worm 15.

As shown in FIGURE 5, the specific arrangeemnt disclosed will provide axial motion of the ball 61 as shown by the arrow 71 when relative rotary motion, shown by the arrow 72, takes place between the input shaft or member 12 and the output member or worm 15. As can be seen, the crossed grooves 57 and 58 continuously position the ball 61 at the intersection of these grooves and provide the proper motion to the ball actuator 61 to actuate the valve spool 35.

The arrangement of this invention has substantial advantages over known power steering valve actuating mechanisms. One very substantial advantage is that the ball actuator 61 acts as a perfect swivel or universal joint that will permit misalignment of the centerlines of the valve spool 35, the output member or worm 15 and the input member or shaft 12 without causing binding or sticking of the valve actuating mechanism. Furthermore, it is quite inexpensive and uncomplicated to construct when compared with other known valve actuating mechanisms. It also provides a very compact arrangement, particularly in an axial direction, since the only added length needed is the short extension of the valve spool 35 to extend between the portions of the input member or shaft 12 and the output member or worm 15 that contain the grooves 57 and 58.

It is to be understood that this invention is not to be limited to the exact construction shown and described but that various changes and modifications may be made without departing from the spirit and scope of the invention as defined in the appended claims.

I claim:

1. In a power steering gear, a cylinder, a power piston mounted in said cylinder, a housing, a valve mounted in said housing including a valve spool, a source of fluid under pressure, said valve interconnecting said source of fluid and said cylinder for selectively directing fluid from said source to opposite ends of said cylinder to actuate said power piston upon axial movement of said valve spool, a manually rotatable input member rotatably mounted in said housing, a rotatable output member rotatably mounted in said housing, means connecting said manually rotatable input member and said rotatable output member for permitting relative rotation of said manually rotatable input member and said rotatable output member upon the application of a predetermined torque to said manually rotatable input member, an axially extending slot positioned in one of said members, a slot skewed with respect to said axially extending slot positioned in the other of said members, a ball positioned in said slots, said valve spool positioned coaxially between said input member and said output member, and having an aperture substantially the same size as said ball for receiving said ball whereby relative rotation of said input member with respect to said output member causes axial movement of said valve spool.

2. In a power steering gear, a cylinder, a power piston mounted in said cylinder, a housing, a valve mounted in said housing including a valve spool, a source of fluid under pressure, said valve interconnecting said source of fluid and said cylinder for selectively directing fluid from said source to opposite ends of said cylinder to actuate said power piston upon axial movement of said valve spool, a manually rotatable input member rotatably mounted in said housing, a rotatable output member rotatably mounted in said housing, means connecting said manually rotatable input member and said rotatable output member for permitting relative rotation of said manually rotatable input member and said rotatable output member upon the application of a predetermined torque to said manually rotatable input member, a slot positioned in said manually rotatable input member, a slot positioned in said rotatable output member, the axes of said slots crossing in said housing, and a valve actuating member positioned in said slots where the axes of said slots cross, said valve spool positioned coaxially between said input member and said output member, and having an aperture substantially the same size as said valve actuating member, said aperture receiving said valve actuating member whereby relative rotation of said input member with respect to said output member causes axial movement of said valve spool.

3. In a power steering gear, a cylinder, a power piston mounted in said cylinder, a housing, a valve mounted in said housing including a valve spool, a source of fluid under pressure, said valve interconnecting said source of fluid and said cylinder for selectively directing fluid from said source to opposite ends of said cylinder to actuate said power piston upon axial movement of said valve spool, a manually rotatable input member rotatably mounted in said housing, a rotatable output member rotatably mounted in said housing coaxially with said input member, said output member having a portion surrounding said input member in radially spaced relationship, said valve spool having an extension positioned coaxially between said input member and said portion of said output member, said portion of said output member having an axial groove positioned therein, said input member having a helical groove positioned therein, said extension of said valve spool having an aperture positioned therein, a ball positioned in said grooves and said aperture, and means connecting said input member and said output member for permitting relative rotation of said input member with respect to said output member upon application of a selected torque to said input member thereby causing axial movement of said valve spool.

4. In a power steering gear, a cylinder, a power piston mounted in said cylinder, a housing, a valve mounted in said housing including a valve spool, a source of fluid under pressure, said valve interconnecting said source of fluid and said cylinder for selectively directing fluid from said source to opposite ends of said cylinder to actuate said power piston upon axial movement of said valve spool, a manually rotatable input member rotatably mounted in said housing, a rotatable output member rotatably mounted within said housing, means connecting said manually rotatable input member and said rotatable output member for permitting limited relative rotation between said input member and said output member upon the application of a selected torque to said manually rotatable input member, one of said members having an axially extending groove and the other of said members having a groove skewed with respect to said axially extending groove, and means positioned in said grooves and coupled to said valve spool for axially moving said valve spool upon relative rotation of said input member and said output member.

5. In a power steering gear, a cylinder, a power piston mounted in said cylinder, a housing, a valve mounted in said housing including a valve spool, a source of fluid under pressure, said valve interconnecting said source of fluid and said cylinder for selectively directing fluid from said source to opposite ends of said cylinder to actuate said power piston upon axial movement of said valve spool, a manually rotatable input member rotatably mounted in said housing, a rotatable output member rotatably mounted in said housing, means connecting said manually rotatable input member and said rotatable output member for permitting limited relative rotation between said input member and said output member upon the application of a selected torque to said manually rotatable input member, said input member, said output member and said valve spool having portions positioned in radial spaced coaxial relationship, said portion of one of said members having an axially extending groove positioned therein, said portion of the other of said members having a groove skewed with respect to said axially extending groove positioned therein, and means positioned in the grooves and coupled to said portion of said valve spool for axially moving said valve spool upon relative rotation of said input member with respect to said output member.

6. In a power steering gear, a cylinder, a power piston mounted in said cylinder, a housing, a valve mounted in said housing including a valve spool, a source of fluid under pressure, said valve interconnecting said source of fluid and said cylinder for selectively directing fluid from said source to opposite ends of said cylinder to actuate said power piston upon axial movement of said valve spool, a manually rotatable input member rotatably mounted in said housing, a rotatable output member rotatably mounted in said housing, means connecting said input member and said output member for permitting relative rotation of said input member with respect to said output member upon the application of a predetermined torque to said input member, a portion of said spool valve being positioned coaxially and in radially spaced relationship between said input and said output members, and means coupled to said valve spool and engaging said input and said output members for converting the relative rotation between said input and said output members into reciprocatory movement of said valve spool.

7. In a power steering gear, a housing, a valve spool mounted in said housing and adapted to control the flow of fluid to power the power steering gear, a manually rotatable input member rotatably mounted in said housing, a rotatable output member rotatably mounted in said housing, means coupling said input member and said output member for permitting relative rotation of said input member with respect to said output member upon the application of a predetermined torque to said input member, a ball actuator, said input member and said output member including means for receiving said ball actuator and for moving said ball actuator in an axial direction upon relative rotation of said input member with respect to said output member, said valve spool having an aperture receiving said ball actuator whereby said valve spool will be moved in an axial direction upon relative rotation of said input member with respect to said output member.

8. In a power steering gear, a housing, a valve spool mounted in said housing and adapted to control flow of fluid to power the power steering gear, a manually rotatable input member rotatably mounted in said housing, a rotatable output member rotatably mounted in said housing, means connecting said input member and said output member for permitting relative rotation of said input member with respect to said output member upon the application of a predetermined torque to said input member, a valve actuating means, said input member and said output member including groove means for receiving said valve actuating means and for moving said valve actuating means in an axial direction upon relative rotation of said input and said output members, an aperture positioned in said valve spool substantially the same size as said valve actuating means and receiving said valve actuating means whereby said valve spool will be moved axially upon relative rotation of said input member and said output member.

9. In a power steering gear, a housing, a valve spool mounted in said housing and adapted to control flow of fluid to power the power steering gear, a manually rotatable input member rotatably mounted in said housing, a rotatable output member rotatably mounted in said housing, means connecting said input member and said output member for permitting relative rotation of said input member with respect to said output member upon the application of a predetermined torque to said input member, said input member and said output member each having a groove means positioned therein, the axes of said grooves being positioned in a nonparallel relationship and crossing in said housing, a ball actuator positioned in said grooves at the position where said grooves cross, an aperture positioned in said valve spool substantially the same size as said ball actuator actuating means and receiving said ball actuator whereby said valve spool will be moved axially upon relative rotation of said input member and said output member.

10. In a power steering gear, a housing, a manually rotatable input member rotatably mounted in said housing, a rotatable output member rotatably mounted in said housing in spaced telescoping relationship with said input member, a hollow valve spool surrounding a portion of said input member in said housing and adapted to control the flow of fluid to power the power steering gear, a portion of said valve spool extending into the space between said input and output members, means connecting said input member and said output member for permitting relative rotation of said input member with respect to said output member upon the application of a predetermined torque to said input member, means mounted in the space between said input and output members and contacting said portion of said valve spool and movable in an axial direction upon relative rotation of said input member and said output member.

11. In a power steering gear, a housing, a manually rotatable input member rotatably mounted in said housing, a rotatable output member rotatably mounted in said housing in spaced telescoping relationship with said input member, a hollow valve spool surrounding a portion of said input member in said housing and adapted to control the flow of fluid to power the power steering gear, means connecting said input member and said output member for permitting relative rotation of said input member with respect to said output member upon the application of a predetermined torque to said input member, means mounted in the space between said input and output members and contacting said valve spool and movable in an axial direction upon relative rotation of said input member and said output member.

References Cited by the Examiner
UNITED STATES PATENTS

| | | | |
|---|---|---|---|
| 2,246,733 | 6/1941 | Kiefer | 74—57 |
| 2,539,921 | 1/1951 | Neisingh | 74—57 |
| 2,627,187 | 2/1953 | Davis | 91—368 |
| 2,809,532 | 10/1957 | Ethington et al. | 91—368 |
| 2,833,253 | 5/1958 | Wittren | 91—391 |
| 3,023,827 | 3/1962 | Sheler | 91—368 |
| 3,099,188 | 7/1963 | Folkerts | 91—380 |

MARTIN P. SCHWADRON, *Primary Examiner.*

PAUL E. MASLOUSKY, *Examiner.*